United States Patent

Hedrick et al.

[11] Patent Number: 6,150,001
[45] Date of Patent: Nov. 21, 2000

[54] MAGNETIC RECORDING DISK WITH POLYCYANATE ESTER OVERLAYER

[75] Inventors: James Lupton Hedrick, Pleasanton; Charles Mathew Mate; Junhua Wu, both of San Jose, all of Calif.

[73] Assignee: International Business Machines Corporation, Armonk, N.Y.

[21] Appl. No.: 09/050,656

[22] Filed: Mar. 30, 1998

[51] Int. Cl.$^7$ .............................. B32B 3/02; C07C 261/00
[52] U.S. Cl. ................. 428/65.4; 428/336; 428/694 TP; 428/900; 560/301
[58] Field of Search ................................ 428/332, 422.8, 428/423.1, 425.8, 425.9, 694 TP, 694 TC, 64.2, 64.3, 64.4, 64.6, 65.3, 65.5, 65.4, 65.8, 336; 560/301

[56] References Cited

U.S. PATENT DOCUMENTS 5,763,071  6/1998  Chen et al. ............................. 428/332
5,824,427  10/1998  Kobayashi et al. ................ 428/694 TS

FOREIGN PATENT DOCUMENTS 61-269223A  11/1986  Japan .

OTHER PUBLICATIONS

T. H. Baum et al., "UV–Induced Polymerization of Chemically Bonded Lubricant Films onto Thin–Film Magnetic Recording Disks" IBM Technical Disclosure bulletin vol. 36, No. 08, Aug. 1993, p. 599.

S. L. Simon et al., "Cure Kinetics of a Thermosetting Liquid Dicyanate Ester Monomer/High–Tg Polycyanurate Material" Journal of Applied Polymer Science, vol. 47, pp. 461–485 (1993).

T. Fang et al., "Polycyanate Esters: Science and Applications" Progress in Polymer Science, vol. 20, pp. 61–118 (1995).

*Primary Examiner*—Sheeba Ahmed
*Attorney, Agent, or Firm*—Thomas R. Berthold

[57] ABSTRACT

Reactive monomers of cyanate esters are vapor deposited onto thin film disks used for magnetic recording. The monomer films are then irradiated with ultraviolet (UV) light to polymerize the deposited monomer to form a solid, robust polycyanate ester overlayer on the disk that becomes smoother, more corrosion resistant and, when lubricated, more durable than disks without the overlayer. The polycyanate ester overlayer can either replace the conventional carbon overcoat or allow a substantially thinner carbon overcoat to be used.

7 Claims, 1 Drawing Sheet

MAGNETIC RECORDING DISK WITH POLYCYANATE ESTER OVERLAYER

TECHNICAL FIELD

This invention relates to magnetic recording disks, and more particularly to the overcoats used to provide corrosion protection and durability for the disks.

BACKGROUND OF THE INVENTION

In magnetic recording disk drives, data is stored in a thin magnetic layer on the disk. Data is written to and read from the disk by a recording head at the back of a slider flying in close proximity to the magnetic layer at high speeds.

The magnetic recording disk typically comprises a substrate, such as a disk blank made of glass or an aluminum-magnesium (AlMg) alloy with a nickel-phosphorous (Ni—P) surface coating, a cobalt-based magnetic alloy film formed by sputter deposition over the substrate, and a sputter-deposited underlayer, such as a layer of chromium (Cr) or a chromium-vanadium (Cr—V) alloy, between the substrate and the magnetic layer. A protective overcoat, such as a sputter-deposited amorphous carbon film, is formed over the magnetic layer to provide corrosion resistance and wear resistance from the slider. In contact start-stop (CSS) types of disk drives the slider is at rest on the disk when the drive is started and comes to rest on the disk when the drive is stopped. A liquid perfluoropolyether (PFPE) lubricant is also maintained on the surface of the protective disk overcoat to prevent damage to the head and the disk during starting and stopping of the disk.

Protective carbon overcoats for thin film disks are well known. They are typically formed by sputter deposition from a graphite target, and are generally called protective carbon overcoats, "diamond-like" carbon overcoats, amorphous carbon overcoats, or in the case of those overcoats formed by sputter deposition in the presence of a hydrogen-containing gas, hydrogenated carbon overcoats. Tsai et al. in "Structure and Properties of Sputtered Carbon Overcoats on Rigid Magnetic Media Disks," *J. Vac. Science Technology*, A6(4), July/August 1988, pp. 2307–2314, describe such protective carbon overcoats and refer to them as amorphous "diamond-like" carbon films, the "diamond-like" referring to their hardness rather than their crystalline structure. U.S. Pat. No. 4,778,582, assigned to IBM, describes a protective hydrogenated disk carbon overcoat formed by sputtering a graphite target in the presence of Ar and hydrogen ($H_2$). The carbon overcoats may also be formed by plasma-enhanced chemical vapor deposition (CVD) and may include nitrogen in addition to hydrogen, as described by Kaufman et al., *Phys. Rev. B*, Vol. 39, p. 13053 (June 1989).

To increase the areal density of the data magnetically recorded on the disk, the recording head must be brought close to the magnetic layer, which means that the overcoat thickness must be substantially reduced, i.e., to less than 5 nm in future disk drives. Consequently, an important challenge faced by the disk drive industry is how to make protective disk overcoats that are ultra-thin yet still provide the desired durability and corrosion protection. A major obstacle to reducing the overcoat thickness is that, in order to achieve good magnetic recording characteristics, the magnetic layer must usually be formed on a slightly roughened or textured substrate. Yet, in order to achieve good durability and corrosion protection, the smoothest final disk surface is desired.

What is needed is an ultra-thin disk overcoat that can provide improved durability and corrosion protection while also providing a planarized final disk surface.

SUMMARY OF THE INVENTION

In this invention, reactive monomers of cyanate esters are vapor deposited onto thin film disks used for magnetic recording. The monomer films are then irradiated with ultraviolet (UV) light to polymerize the deposited monomer to form a solid, robust polycyanate ester overlayer on the disk that becomes smoother, more corrosion resistant and, when lubricated, more durable than disks without the overlayer. The process is free of initiators and solvents, can be controlled to a single molecular layer in thickness, and has the potential for further improvement through alternate material selection from this class and by improved processing conditions.

The polycyanate ester overlayer can be formed on the carbon overcoat or directly on the magnetic layer of the disk. Thus it can either replace the conventional carbon overcoat or allow a substantially thinner carbon overcoat to be used.

DESCRIPTION OF THE PREFERRED EMBODIMENT

Figure 1:
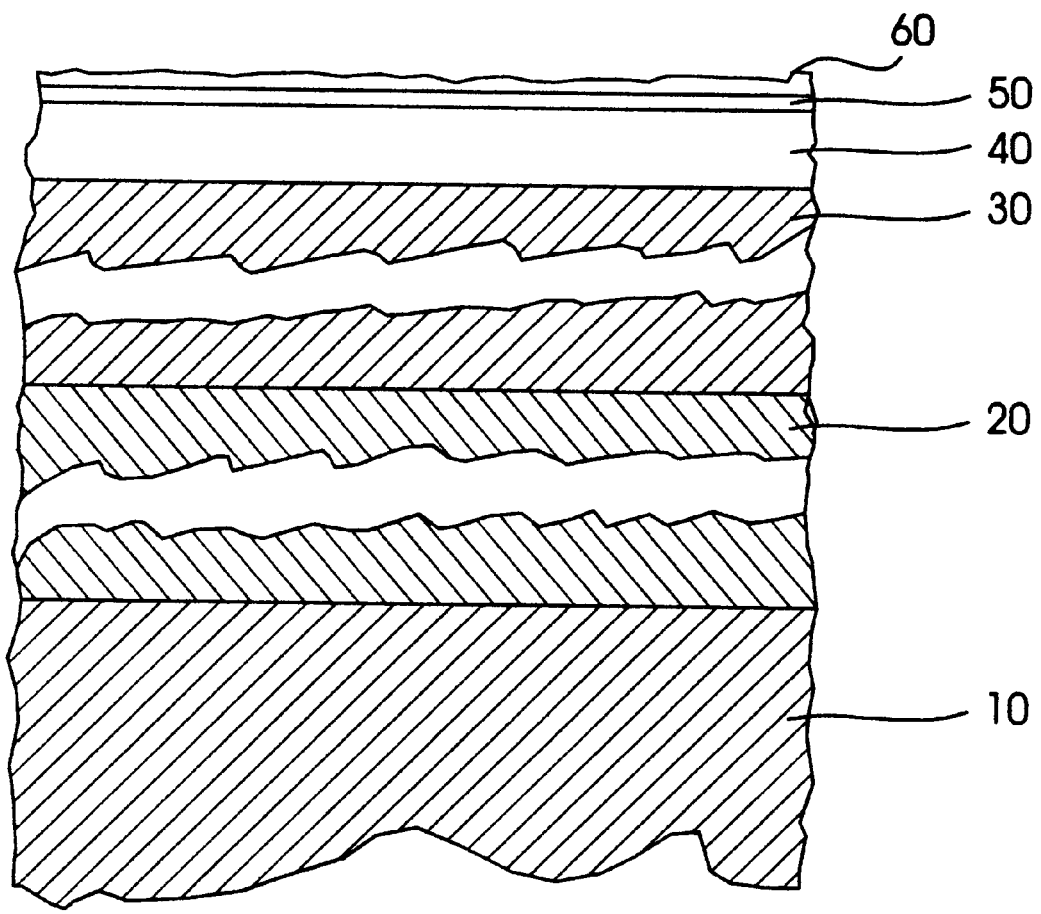
FIG. 1 is a sectional view of a portion of the magnetic recording disk according to the present invention.

The magnetic recording disks used in the experimental results described below have a structure typical of those found in rigid disk drives: 95 mm diameter Al—Mg alloy disk blank with a Ni—P coating which serves as the substrate onto which is sputter deposited a Cr underlayer, a cobalt-alloy magnetic layer, and an amorphous hydrogenated carbon overcoat. Disks with three different thicknesses of carbon overcoats were used: 3, 12, and 14 nm. The carbon overcoats had a high degree (30–35 at. %) of hydrogen incorporated into them.

Polycyanate ester polymers are known as coating materials, primarily as matrix resins for composites (e.g., boards, cards, etc.) or for dielectric coatings for semiconductor devices. These coatings are typically several microns to millimeters thick and are polymerized by thermal curing of cyanate ester monomers that have been coated by spinning onto the device substrates or by dip-coating onto fibers. These materials and their preparation are described by T. Fang and D. A. Shimp, "Polycyanate Esters: Science and Applications," *Prog. Polym. Sci.*, Vol. 20, 61, 118, pp. 61–118, Elsevier Science Ltd. 1995.

The cyanate ester monomer used here as a starting material is dicyanate of bisphenol A (DCBA), $C\equiv N$—O—Phenyl—$C(CH_3)_2$—Phenyl—O—$C\equiv N$, supplied by Ciba Specialty Chemicals under the brand name of AroCy B-10.

First, the DCBA source is heated to 220° C. A disk is placed a few centimeters away in air so that the monomer is slowly vapor deposited from the hot source to the colder disk. The disk remains at room temperature during the deposition process. The thickness of the monomer film deposited onto the carbon overcoat is controlled by the time exposed to vapor and is measured using ellipsometry. The thickness of the deposited monomer film achieved by this method ranges from less than 0.1 nm to over 100 nm. The monomer can also be deposited onto the disks by dipping, wiping, or spraying, but vapor deposition is preferred because it selectively deposits the monomer onto the disk, leaving the impurities in the original source. The vapor deposition can also occur in vacuum, but the presence of an atmosphere between the source and the disk helps to control the deposition rate.

While the thick polycyanate ester films used as dielectric coatings for semiconductor devices are cured by heating, it has been found that heating causes the ultra-thin cyanate monomer films used for disk overlayers to evaporate rather than polymerize. Thus, in the present invention the disk with the monomer film is exposed to radiation from a low pressure mercury ultraviolet (UV) lamp which emits over the wavelength range of 254 to 185 nm with an intensity of approximately 5 milliwatts/cm$^2$. Oxygen and other reactive gases are excluded during irradiation by continually flushing the exposure chamber with nitrogen or other inert gases. A few minutes' exposure to this UV radiation is sufficient to completely polymerize a 1 nm thick film. Polymerization of the monomer film on the disk from UV curing was proved using the following techniques:

(a) Fourier Transform Infrared (FTIR) spectroscopy showed that 2250 cm$^{-1}$ vibrational mode from the C≡N groups in the monomer disappeared after UV curing and new broad peaks appear in the range of 900–1800 cm$^{-1}$, consistent with the cyanate groups reacting to form crosslinked networks.

(b) The cured film could not be removed or dissolved by rinsing with methyl-ethyl-ketone or other solvents capable of dissolving the DCBA monomer.

(c) The cured films could be heated to at least 220° C. for 10 minutes without decrease in thickness, while the monomer film quickly evaporated at this temperature.

While thermal curing is not possible with the present invention as describe above, thermal curing may be possible if a prepolymer, such as a trimer made from cyclotrimerizing three monomers, was deposited on the disk rather than the monomers, or if a suitable initiator was added to the monomer film.

The completed disk structure according to the present invention is shown in sectional view in FIG. 1. The Al—Mg alloy disk blank has a Ni—P coating which serves as the substrate 10 onto which is sputter deposited a Cr underlayer 20, a cobalt-alloy magnetic layer 30, and an amorphous hydrogenated carbon overcoat 40. The polycyanate ester overlayer 50 is formed on the carbon overcoat 40 and a layer of PFPE lubricant 60 is on top of the polycyante ester overlayer 50.

TOPOGRAPHY OF THE DISK SURFACES

In certain types of conventional magnetic recording disks the disk substrate may be deliberately textured in the circumferential direction to improve the growth of the magnetic layer so that it has magnetic properties in the preferred circumferential direction. However, it is desired to have the final disk surface above the magnetic layer as smooth as possible.

In the present invention atomic force microscopy (AFM) was used to measure the changes in topography of the disk surfaces with the addition of the polycyanate ester overlayer. The root-mean-square (RMS) roughness for a typical disk surface was found to decrease from 1.5 nm to 1.1 nm over a 10 μm×10 μm area when a 1 nm thick polycyanate ester overlayer was added to a disk surface. The AFM images show that the decreased roughness comes from the polymer filling in the deep valleys and pinhole defects on the surface. Thus, while the sputter-deposited carbon overcoat is conformal with the surface of the magnetic layer and thus of the underlying textured substrate, the polycyanate ester overlayer disclosed here helps to planarize the final disk surface.

In addition, since disk failures caused by corrosion and poor durability are thought to initiate at the pinholes and deep valleys on the disk surface, filling them with the polycyanate polymer also improves corrosion and durability performance of these disks, as described below.

CORROSION TESTING

The added polycyanate ester overlayer greatly improves the corrosion resistance of the disks. A corrosion test was carried out by soaking disks in an aqueous solution of 5 Molar hydrochloric acid for two hours and examining the disk surface for corrosion defects using dark field optical microscopy. Disks with 12 nm thick carbon overcoats have revealed a defect density of 10$^6$/cm$^2$ after this corrosion process, while disks of the same type with the added 1 nm thick polycyanate ester overlayer revealed only 10$^3$/cm$^2$ defect density after the same test. This is a thousand times improvement in defect density.

DURABILITY TESTING

Contact-start-stop (CSS) testing of the disks was used to determine the durability of the slider-disk interface with and without the polycyanate overlayer. The CSS test is designed to test how reliable the slider-disk interface is in a disk drive when the drive is repeatedly powered on and off. For the disks used for the CSS testing, the substrates were initially textured using laser pulses to generate 28 nm high rim-only bumps with a 50 μm×100 μm spacing. Prior to CSS testing, the disks were lubricated with a 1 nm thick film of PFPE lubricant. The slider was attached to a suspension that provides a 45 milli-Newtons (mN) load that pushes the slider on the disk. Strain gauges at the other end of the suspension measure the friction forces acting on the slider. In the CSS experiment, the disk is started to spin with an acceleration of 150 rad/s$^2$, then spun at 3600 rpm for a few seconds, and then decelerated until the disk has completely stopped spinning. This start-stop cycle is repeated until a visible wear track is observed on the disk. The number of cycles that the disk survives without visible wear measures the slider-disk interface durability. The maximum friction force during the start-stop cycles is also recorded. The results of the CSS testing are summarized in the table below. From the table, one concludes that a disk with a 3 nm thick carbon overcoat plus an 0.8 nm thick polycyanate ester overlayer was durable for at least 28,000 CSS cycles, at which point the CSS test was truncated. Disks with the same type of carbon overcoat but without the polycyanate ester overlayer failed anywhere from 100 to 24,000 cycles, much less than with the polycyanate ester overlayer. The measured maximum friction force during the CSS cycles was similar with and without the polycyanate ester overlayer.

| CSS Testing of Polycyanate Ester Overlayer on Disks | | | |
| --- | --- | --- | --- |
| Carbon Overcoat Thickness (nm) | Polycyanate Ester Overlayer Thickness (nm) | Cycles of CSS (T = Truncated) (F = Failure) | Maximum Friction in CSS (mN) |
| 3 | 0.8 | 28,000 (T) | 14–24 |
| 3 | 0.0 | 100 (F) | 10–20 |
| | | 1,000 (F) | |
| | | 2,000 (F) | |
| | | 20,000 (F) | |
| | | 24,000 (F) | |

Typical carbon overcoat thicknesses for CSS disk drives are in the range of approximately 10 to 20 nm. Thicknesses less than approximately 10 nm do not provide sufficient durability for the disks. Thus when the polycyanate ester overlayer is used on top of the carbon overcoat, the carbon overcoat thickness can be less than 10 nm. Also, the polycyanate ester overlayer allows for a significant reduction in total protective overcoat thickness, which results in much closer spacing between the read/write head and the magnetic layer. As shown by the above CSS data, a total thickness of 3.8 nm (3 nm carbon plus 0.8 nm polycyanate ester) provides sufficient durability protection. Polycyanate ester overlayer thicknesses below 1.5 nm provided the smoothest, most uniform surfaces, so approximately 0.5 to 1.5 nm is the preferred range of overlayer thickness. Uniform polycyanate ester films thicker that 1.5 nm can be made by repeatedly depositing and curing films of less than 1.5 nm thickness or by using a cyanate ester monomer with better wetting capability.

The overlayer may also be formed directly on the magnetic layer, thereby eliminating the need for a conventional protective carbon overcoat.

While the overlayer of the present invention was polymerized from the dicyanate of bisphenol A [C≡N—O—Phenyl—C(CH$_3$)$_2$—Phenyl—O—C≡N], other cyanate ester monomers that can be evaporated and then cured by UV to form a planarized ultra-thin coating include the following:

C≡N—O—Phenyl—C(CH$_3$)(H)—Phenyl—O—C≡N

C≡N—O—Phenyl—S—Phenyl—O—C≡N

C≡N—O—Phenyl—O—Phenyl—O—C≡N

C≡N—O—Phenyl—C(CF$_3$)$_2$—Phenyl—O—C≡N

These monomers belong to the class of multi-functional cyanate esters (NCO—R—OCN), where R can be a wide variety of chemical structures, many examples of which are described in the previously cited T. Fang et al. article at page 97.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetic recording disk comprising:

a disk substrate;

an underlayer formed on the substrate;

a cobalt alloy magnetic layer formed on the underlayer; and a polycyanate ester overlayer formed over the magnetic layer.

2. The disk according to claim 1 wherein the polycyanate ester overlayer has a thickness in the range of approximately 0.5 to 1.5 nm.

3. The disk according to claim 1 further comprising a carbon layer formed between the magnetic layer and the polycyanate ester overlayer, and wherein the polycyanate ester overlayer is formed directly on the carbon overcoat.

4. The disk according to claim 3 wherein the carbon layer has a thickness less than 10 nm.

5. The disk according to claim 1 wherein the polycyanate ester overlayer is polymerized from a cyanate ester monomer selected from the group consisting of:

C≡N—O—Phenyl—C(CH$_3$)$_2$—Phenyl—O—C≡N;

C≡N—O—Phenyl—C(CH$_3$)(H)—Phenyl—O—C≡N;

C≡N—O—Phenyl—S—Phenyl—O—C≡N;

C≡N—O—Phenyl—O—Phenyl—O—C≡N; and

C≡N—O—Phenyl—C(CF$_3$)$_2$—Phenyl—O—C≡N.

6. The disk according to claim 5 wherein the cyanate ester monomer is [C≡N—O—Phenyl—C(CH$_3$)(H)—Phenyl—O—C≡N] C≡N—O—Phenyl—C(CH$_3$)$_2$—Phenyl—O—C≡N.

7. The disk according to claim 1 further comprising a lubricant formed on the polycyanate ester overlayer.

* * * * *